US011952883B2

(12) United States Patent
Sun et al.

(10) Patent No.: US 11,952,883 B2
(45) Date of Patent: Apr. 9, 2024

(54) SYSTEM AND METHOD FOR MITIGATING STICK-SLIP

(71) Applicant: Halliburton Energy Services, Inc., Houston, TX (US)

(72) Inventors: Zhijie Sun, Spring, TX (US); Sujian Huang, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 43 days.

(21) Appl. No.: 16/822,944

(22) Filed: Mar. 18, 2020

(65) Prior Publication Data

US 2021/0079781 A1 Mar. 18, 2021

Related U.S. Application Data

(60) Provisional application No. 62/902,097, filed on Sep. 18, 2019.

(51) Int. Cl.
| | |
|---|---|
| *E21B 44/04* | (2006.01) |
| *E21B 3/035* | (2006.01) |
| *E21B 44/00* | (2006.01) |
| *E21B 47/024* | (2006.01) |
| *G05D 19/02* | (2006.01) |

(52) U.S. Cl.
CPC .............. *E21B 44/04* (2013.01); *E21B 3/035* (2013.01); *E21B 47/024* (2013.01); *G05D 19/02* (2013.01); *E21B 44/005* (2013.01)

(58) Field of Classification Search
CPC ...... E21B 44/00; E21B 44/005; E21B 47/024; E21B 3/035; G05D 19/02
See application file for complete search history.

(56) References Cited

U.S. PATENT DOCUMENTS

| | | | |
|---|---|---|---|
| 9,062,537 B1* | 6/2015 | Holt | E21B 47/12 |
| 9,689,250 B2 | 6/2017 | Badkoubeh et al. | |
| 2011/0245980 A1* | 10/2011 | Nessjoen | E21B 44/00 700/280 |

(Continued)

FOREIGN PATENT DOCUMENTS

WO WO2019136280 A2 7/2019

OTHER PUBLICATIONS

International Search Report and Written Opinion dated Jul. 9, 2020 for corresponding PCT Application No. PCT/US2020/023531 filed Mar. 19, 2020.

*Primary Examiner* — Tara Schimpf
*Assistant Examiner* — Yanick A Akaragwe
(74) *Attorney, Agent, or Firm* — K&L Gates LLP (57) ABSTRACT

A method for drilling a well. The method may include detecting stick-slip vibrations at a frequency via a downhole sensor. The method may further include determining a reflection coefficient of a drill bit for the frequency based on at least one of a rotational speed of the drill bit or a torque of the drill bit. The method may also include determining a reflection coefficient of a top drive for the frequency based on at least one of a rotational speed of the top drive or a torque produced by the top drive. The method may further include adjusting a control system in electronic communication with the top drive based on the reflection coefficient of the drill bit for the frequency and the reflection coefficient of the top drive for the frequency.

20 Claims, 5 Drawing Sheets

(56) References Cited

U.S. PATENT DOCUMENTS

| | | | |
|---|---|---|---|
| 2015/0152723 A1* | 6/2015 | Hay | E21B 10/62 |
| | | | 175/17 |
| 2016/0237802 A1* | 8/2016 | Boone | E21B 44/00 |
| 2016/0326864 A1* | 11/2016 | Dwars | E21B 47/024 |
| 2017/0101861 A1 | 4/2017 | Kyllingstad | |
| 2018/0038215 A1 | 2/2018 | Badkoubeh | |
| 2018/0149012 A1 | 5/2018 | Dwars | |
| 2019/0211665 A1* | 7/2019 | Zha | E21B 44/08 |
| 2019/0242235 A1 | 8/2019 | Kyllingstad | |
| 2020/0003046 A1* | 1/2020 | Zheng | E21B 47/12 |
| 2021/0246776 A1* | 8/2021 | Shor | E21B 44/04 |

\* cited by examiner

SYSTEM AND METHOD FOR MITIGATING STICK-SLIP

BACKGROUND

This section is intended to provide relevant background information to facilitate a better understanding of the various aspects of the described embodiments. Accordingly, these statements are to be read in this light and not as admissions of prior art.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Subterranean drilling apparatuses such as drill bits, drill strings, bottom-hole assemblies (BHAs), and/or downhole tools may contact the borehole wall in such a way that they become caught or lodged in the borehole wall, causing the drill string to "stick." When the drilling apparatus "sticks," the rotational movement of the drill string is either stopped or severely decreased. Torque is still imparted to the drill string at the surface, despite the drilling apparatus being stuck, causing the drill string to twist. Once the torque applied to the drill string overcomes the force of static friction on the drilling apparatus, the drill string "slips" or releases from the borehole wall. This phenomenon is problematic for several reasons, such as possible decrease in the lifespan of downhole components, decrease in the quality of the borehole, and delays in drilling.

BRIEF DESCRIPTION OF THE DRAWINGS

Embodiments of the systems and method for mitigating stick-slip are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure describes a system for mitigating stick-slip. The system determines the coefficient of reflection of both the drill bit and the top drive while drilling. The top drive is then adjusted based on the coefficients of reflection to mitigate stick-slip.

Figure 1:
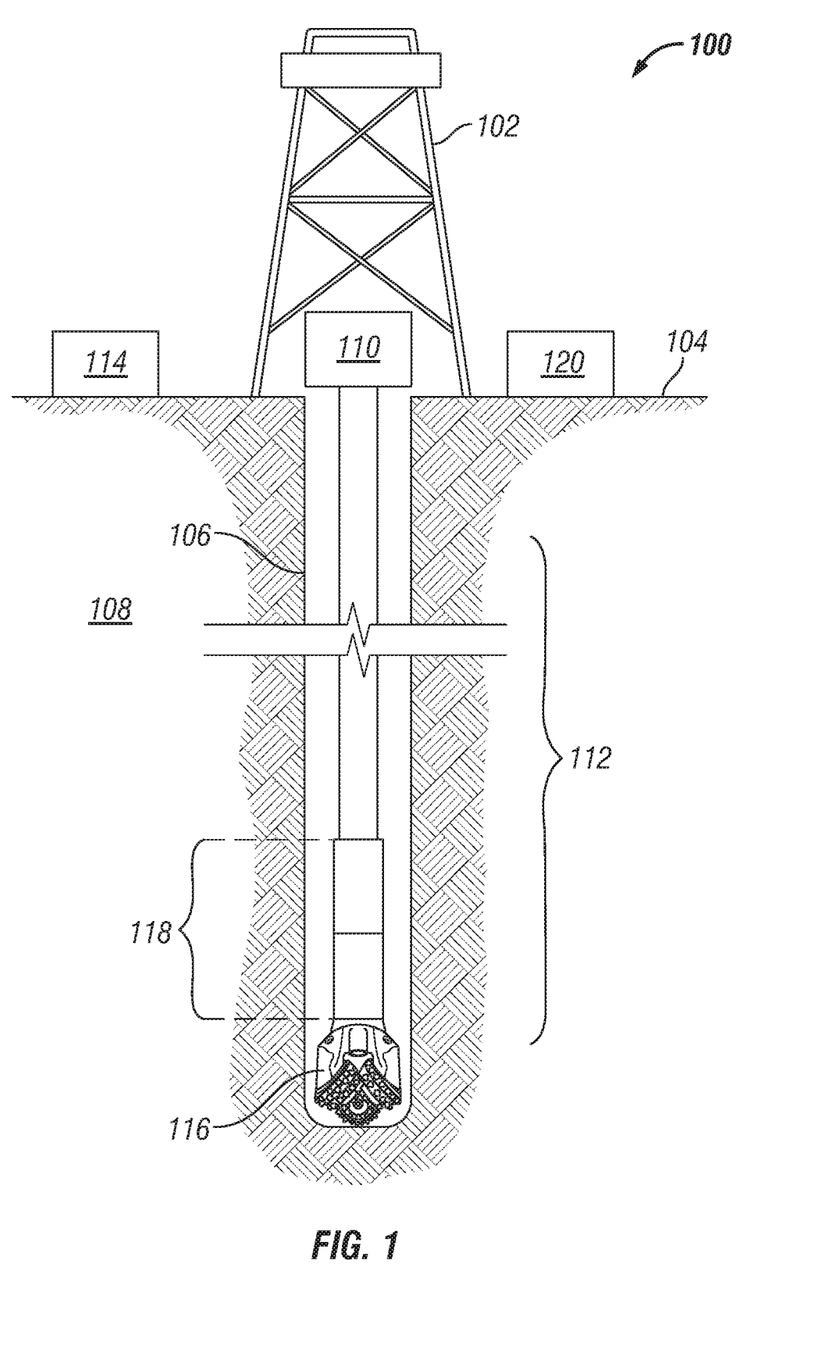
FIG. 1 is a cross-sectional diagram of a drilling system, according to one or more embodiments.

FIG. 1 is a cross-sectional view of a drilling system 100 to drill a borehole 106. The drilling system 100 includes a rig 102 mounted at the surface 104, positioned above the borehole 106 within a subterranean formation 108. Although the surface 104 is shown as land in FIG. 1, the drilling rig of some embodiments may be located at sea for an offshore well. The drilling rig 102 includes a top drive 110 coupled to a drill string 112. A control system 114 at the surface 104 controls the operation of at least some of the drilling equipment, including the top drive 110. The drill string 112 is coupled to the drill bit 116 such that the drill bit 116 is coupled to the top drive 110 via the drill string 112. Accordingly, the top drive 110 applies torque to the drill string 112, which in turn applies torque to the drill bit 116, causing it to rotate.

As shown in FIG. 1, the borehole 106 may be formed in a vertical or substantially vertical orientation relative to the surface 104. Although not shown, it is known by those of ordinary skill in the art that a lateral borehole may in some instances be formed in a horizontal or substantially horizontal orientation relative to the surface of the well. However, reference herein to either the main borehole or the lateral borehole is not meant to imply any particular orientation, and the orientation of each of these boreholes may include portions that are vertical, non-vertical, horizontal or non-horizontal. Further, the term "uphole" refers a direction that is towards a wellhead of a well, while the term "downhole" refers a direction that is away from the wellhead of the well. Further, as shown, the borehole 106 may not be entirely substantially vertical but in some areas may deviate at an angle from vertical and even possibly return to vertical at a later portion.

The drill string further comprises a bottom hole assembly (BHA) 118, which may include tools such as LWD/MWD elements. The LWD/MWD elements comprise downhole instruments that continuously or intermittently monitor drilling parameters and formation data and transmit the information to a surface detector 120 in communication with the control system 114 by some form of mud pulse telemetry or through other methods known to those skilled in the art. The BHA 118 and/or drill bit 116 also include a sensor or sensors capable of measuring the rotational speed of the drill bit 116. Additionally, the BHA 118 and/or the drill bit 116 also include a sensor or sensors capable of measuring the torque on the drill bit 116.

During the drilling process, all or part of the drilling assembly (including drill bit 116 and drill string 112) may "stick" during contact with the wall of the borehole 106, whereupon rotational movement of the drill string 112 and/or bit 116 is either stopped or severely decreased. Torque is still be imparted to the drill string 112 from the top drive 110, despite the drill string 112 (or some portion thereof) and/or bit 116 being stuck, causing the drill string 112 above the stuck portion to twist.

As the drill string 112 twists, the torque in the drill string increases. Once the torque overcomes the force of friction on the stuck component, the drill string 112 and/or bit 116 may "slip" or release from the wall of the borehole 106. This stick-slip action causes torsional vibrations, or stick-slip vibrations, at a frequency or over a range of frequencies and may decrease the lifespan of downhole components, including the drill bit 116, LWD/MWD measurement elements within the BHA 118, and decrease the quality of the borehole 106.

In order to determine how to mitigate stick-slip, the drilling system 100 can be modeled using the following partial differential equation:

$$c^2 \frac{\partial^2 u}{\partial x^2} = \frac{\partial^2 u}{\partial t^2} \quad (1)$$

where c is the torsional wave speed equals $\sqrt{G_M/\rho}$, assuming $G_M$ and $\rho$ are the shear modulus and the density of drill string 112, respectively, u(x,t) is the angular displacement of drill string 112 at location x and time t. The angular displacement at the surface is determined by assuming x=0, and the angular displacement of the drill bit 116 is determined by assuming x=L where L is the depth of hole. Taking Laplace transform on both sides of Equation (1), results in the following:

$$c^2 \frac{d^2 U}{dx^2} = s^2 U \quad (2)$$

where $U(x,s) = \mathcal{L}[u(x,t)]$ is the Laplace transform of u(x,t), and s represents the complex frequency in Laplace transform.

A general solution to Equation (2) is found as $$U(x,s) = F \cdot e^{s/c \cdot x} + G \cdot e^{-s/c \cdot x} \quad (3)$$

where F and G are constants (with respect to x) to be determined by boundary and initial conditions. Physically, the first term represents torsional waves going uphole, while the second term describes downward torsional waves.

The boundary conditions for the top drive 110 and the drill bit are then determined. The boundary condition at the top drive 110 can be written as $$J_d \ddot{u} = F_T - F_c \quad (4)$$

where $J_d$ is the equivalent inertia of top drive 110, which may include the inertia of top drive motor and the inertia of top drive gear box, $F_T$ is the torque generated by top drive 110, and $F_c$ is the reaction torque from drill string 112:

$$F_c = -G_M I_M \frac{\partial u}{\partial x}\bigg|_{x=0} \quad (5)$$

where $I_M$ is the second moment of area of drill string 112. Combining Equation (4) and Equation (5) and applying Laplace transform yields $$Js^2 U = F_T + G_M I_M \frac{dU}{dx} \quad (6)$$

The top drive 110 is operated under a control system 114. The control system 114 determines the output torque based on top drive 110 speed. It can be characterized in the frequency domain as $$F_T = -C_d(s) \cdot sU \quad (7)$$

where $C_d(s)$ is the transfer function of control system 114. Applying Equation (6) and Equation (7) as a boundary condition at x=0 to the ordinary differential equation (2) results in the following:

$$JN_d s(F+G) = -C_d(F+G) + \frac{G_M I_M}{c}(F-G) \quad (8)$$

Similarly, by denoting the inertia of drill bit 116 or BHA 118 as $J_b$, and the transfer function from reaction torque of drilling to rotational speed of drill bit 116 as $C_b(s)$, the boundary condition at drill bit 116 x=L is $$J_b s\left(Fe^{s/c \cdot L} + Ge^{-s/c \cdot L}\right) = \\ C_b\left(Fe^{s/c \cdot L} + Ge^{-s/c \cdot L}\right) - \frac{G_M I}{c}\left(Fe^{s/c \cdot L} - Ge^{-s/c \cdot L}\right) \quad (9)$$

By letting $\zeta = G_M I_M/c$, rewriting Equation (8) and Equation (9) in the matrix form leads to $$\begin{bmatrix} J_d s + C_d - \zeta & J_d s + C_d + \zeta \\ (J_b s - C_b + \zeta)e^{s/c \cdot L} & (J_b s - C_b - \zeta)e^{-s/c \cdot L} \end{bmatrix} \begin{bmatrix} F \\ G \end{bmatrix} = 0 \quad (10)$$

To obtain a non-trivial solution to Equation (10), the determinant of $$\begin{bmatrix} J_d s + C_d - \zeta & J_d s + C_d + \zeta \\ (J_b s - C_b + \zeta)e^{s/c \cdot L} & (J_b s - C_b - \zeta)e^{-s/c \cdot L} \end{bmatrix}$$

must be zero. Therefore, $$e^{\frac{2s}{c}L} = \frac{(J_b s - C_b - \zeta)(J_d s + C_d - \zeta)}{(J_b s - C_b + \zeta)(J_d s + C_d + \zeta)} \quad (11)$$

The mechanical impedance of top drive, $Z_d(s)$, is defined as $$Z_d(s) = J_d + C_d(s) \quad (12)$$

Additionally, the coefficient of reflection of the top drive, $r_d$, defined as $$r_d = \frac{\zeta - Z_d}{\zeta + Z_d} \quad (13)$$

Similarly, the mechanical impedance of drill bit 116 $Z_b(s)$, is defined as $$Z_b(s) = J_b + C_b(s) \quad (14)$$

The coefficient of reflection of the drill bit, $r_b$, is defined as $$r_b = \frac{\zeta - Z_b}{\zeta + Z_b} \quad (15)$$

By defining the mechanical impedances and reflection coefficients of the top drive and drill string as shown above, equation (11) is equivalent to $$e^{\frac{s}{c}L} = \sqrt{r_b(s) \cdot r_d(s)} \quad (16)$$

Therefore, the stick-slip vibration will be reduced or eliminated if $|r_d(s) \cdot r_b(s)| < 1$ holds for one or more stick-slip frequencies.

Figure 2:
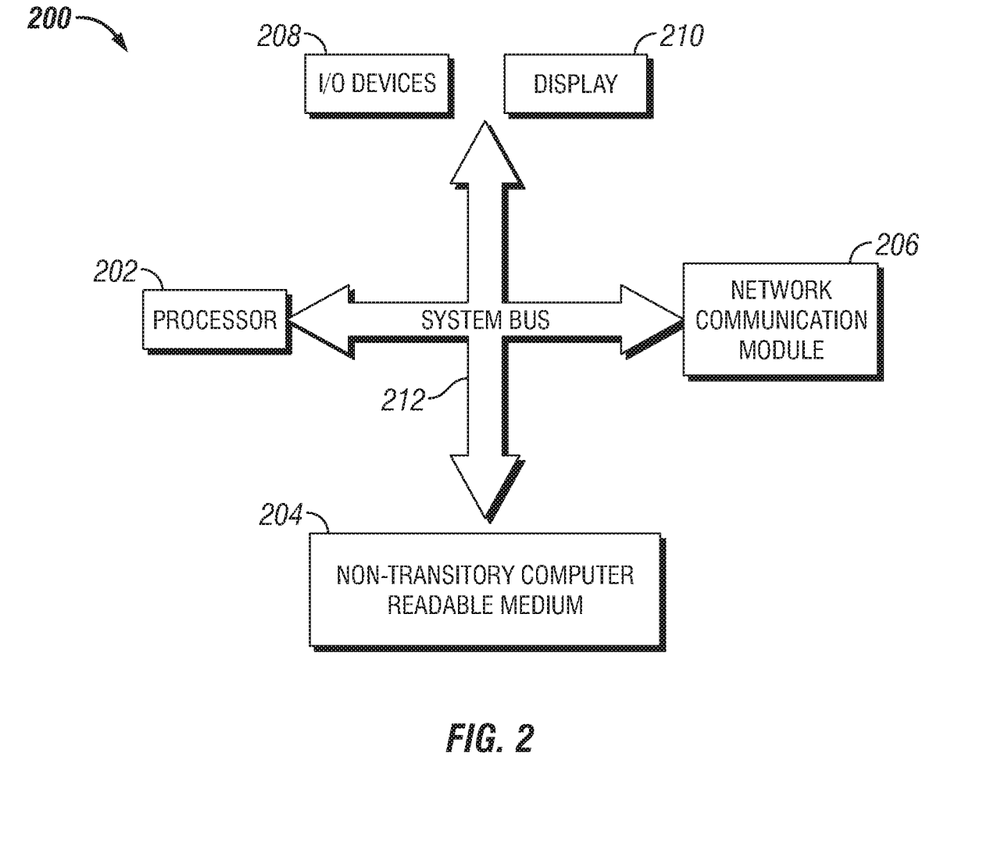
FIG. 2 is a block diagram of a computer system, according to one or more embodiments.

Both the control system 114 and the BHA 118 include computer systems 200, as shown in FIG. 2, that are each capable of performing at least a portion of the functions described below with reference to FIGS. 3 and 4 to reduce or eliminate stick-slip based on the above criteria, $|r_d(s) \cdot r_b(s)| < 1$. The computer system 200 within control system 114 is in electronic commination with the top drive 110 and the surface detector 120 via a wired and/or wireless connection. The computer system 200 within the control system 114 may also include input/output devices and one or more displays. The computer system 200 within the BHA 118 is in electronic communication with LWD/MWD measurement elements and the telemetry system within the BHA 118 via a wired and/or wireless connection.

Each computer system 200 includes at least one processor 202, a non-transitory computer readable medium 204, a network communication module 206, optional input/output devices 208, and an optional display 210 all interconnected via a system bus 212. Software instructions executable by the processor 202 for implementing software instructions stored within the computer system 200 in accordance with the illustrative embodiments described herein, may be stored in the non-transitory computer readable medium 204 or some other non-transitory computer-readable medium.

Although not explicitly shown in FIG. 2, it will be recognized that the computer system 200 may be connected to one or more public and/or private networks via appropriate network connections. It will also be recognized that software instructions may also be loaded into the non-transitory computer readable medium 204 from a CD-ROM or other appropriate storage media via wired or wireless means.

Figure 3:
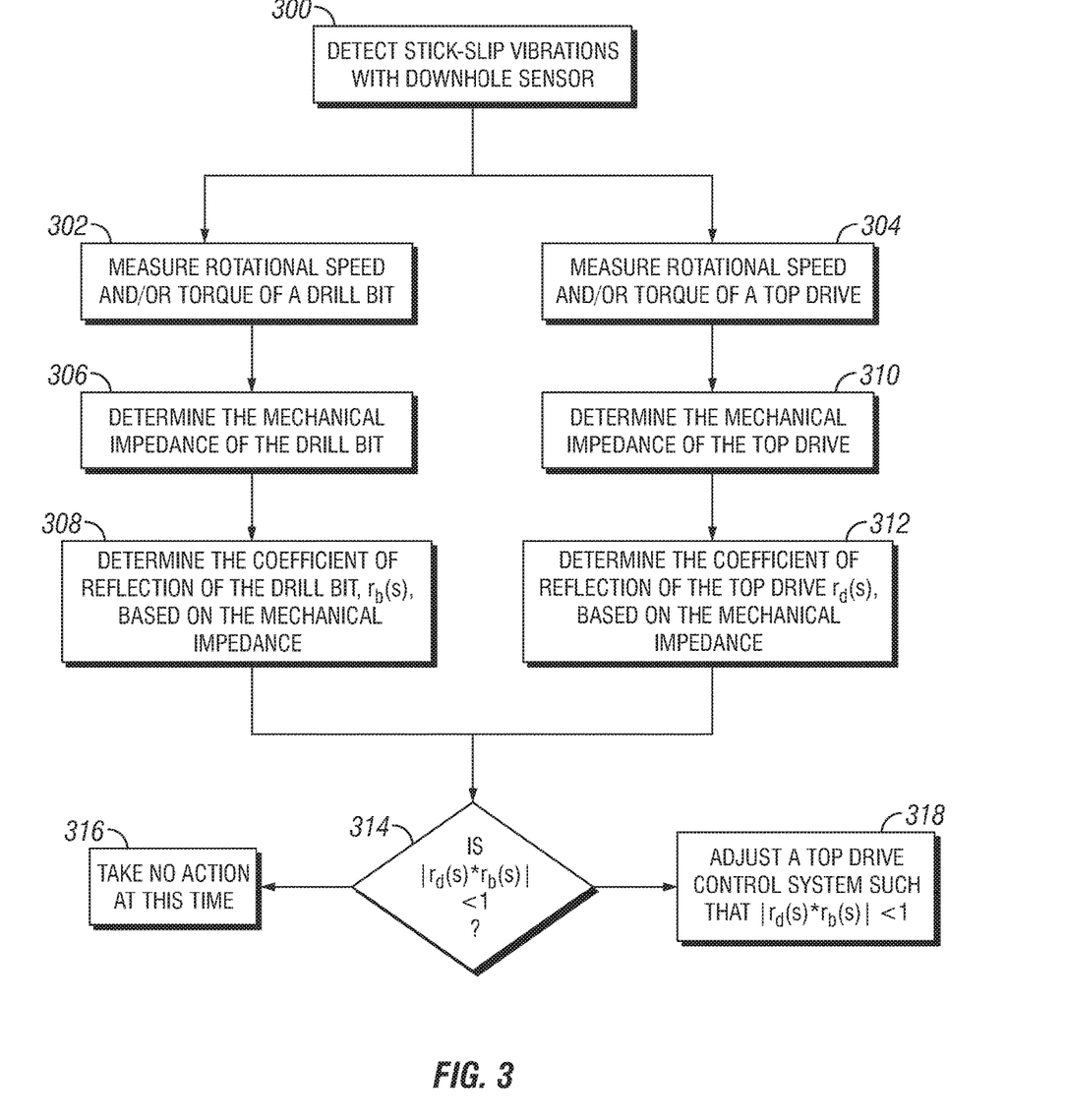
FIG. 3 is a flow chart of a method for drilling a well, according to one or more embodiments.

FIG. 3 is a flow chart of a method of drilling a hydrocarbon-producing well, according to one or more embodiments. The method described in reference to FIG. 3 is performed by the control system 114 and the computer system 200 within the BHA 118 described above with reference to FIG. 2. However, the current disclosure is not thereby limited. The method may also be performed by other computer systems that include a processor capable of executing instructions stored on a non-transitory computer-readable medium.

In step 300, a downhole sensor on the BHA 118 detects stick-slip vibrations at a frequency or over a range of frequencies, as discussed above with reference to FIG. 1. One or more additional sensors on the BHA 118 then measure the rotational speed and/or the torque of the drill bit 116, as shown in step 302. At approximately the same time, sensors on the top drive 110 measure the rotational speed of and/or the torque produced by the top drive 110, as shown in step 304.

Once the rotational speed and/or torque of the drill bit 116 is known, the mechanical impedance of the drill bit 116, $Z_d(s)$ is determined, as shown in step 306. $Z_b(s)$ calculated by taking fast Fourier transform (FFT) of measured bit speed, $V_b(\omega)$, then taking fast Fourier transform (FFT) of measured bit torque, $T_b(\omega)$, and then using the following equation:

$$Z_b(\omega) = T_b(s) \cdot / V_b(\omega)$$

where the "·/" signifies element-by-element division.

The coefficient of reflection of the drill bit, $r_b(s)$, can then be calculated as via the equation shown above for the detected frequency or each frequency of the detected range of frequencies based on $Z_b(\omega)$, as shown in step 308.

In at least one embodiment, $Z_b(\omega)$ is calculated downhole by a computer system in the BHA 118. $Z_b(\omega)$ is then transmitted uphole via the telemetry system in the BHA 118 and $r_b(s)$ is calculated by the control system 114. In other embodiments, both $Z_b(\omega)$ and $r_b(s)$ are calculated by the computer system within the BHA 118, and the telemetry system transmits $r_b(s)$ uphole to the control system 114.

Similarly, once the rotational speed of and/or torque produced by the top drive 110 is known, the mechanical impedance of the top drive 110, $Z_d(s)$, is determined by the control system 114, as shown in step 310. $Z_d(s)$ calculated by taking fast Fourier transform (FFT) of measured top drive speed, $V(\omega)$, then taking fast Fourier transform (FFT) of measured top drive torque, $T_d(\omega)$, and then calculating $Z_d(\omega)$ as shown above. The coefficient of reflection of the top drive 110, $r_d(s)$, can then be calculated by the control system via the equation shown above for each of the detected frequency or each frequency of the detected range of frequencies based on $Z_d(CO)$, as shown in step 312.

As shown in step 314, the method then determines if $|r_d(s) \cdot r_b(s)| < 1$. If $|r_d(s) \cdot r_b(s)| < 1$ is true for the detected frequency or each frequency of the detected range of frequencies, the top drive 110 is not adjusted by the control system, as shown in step 316. However, if $|r_d(s) \cdot r_b(s)| < 1$ is not true for the detected frequency or each frequency of the detected range of frequencies, the control system 114 reduces a top drive gain or, if the control system 114 contains an speed-error integrator, increases or decreases an integral time of the control system 114, such that $|r_d(s) \cdot r_b(s)| < 1$ is true, as shown in step 318.

Alternatively or in addition to adjusting the control system 114, the control system may notify an operator through a visual indicator, audible indicator, electronic message, or any combination thereof if $|r_d(s) \cdot r_b(s)| < 1$ is not true for the detected frequency or each frequency of the detected range of frequencies. In such cases, the operator may adjust the top drive 110 instead of the control system 114.

The transmittal of either $Z_b(\omega)$ or $r_b(s)$ from the BHA 118 allows the control system 114 to control the top drive 110 using real-time or near real-time information. Utilizing this information allows the control system 114 or an operator to respond quickly and more accurately when adjusting the control system 114 to address stick-slip of the drill bit 116.

Figure 4:
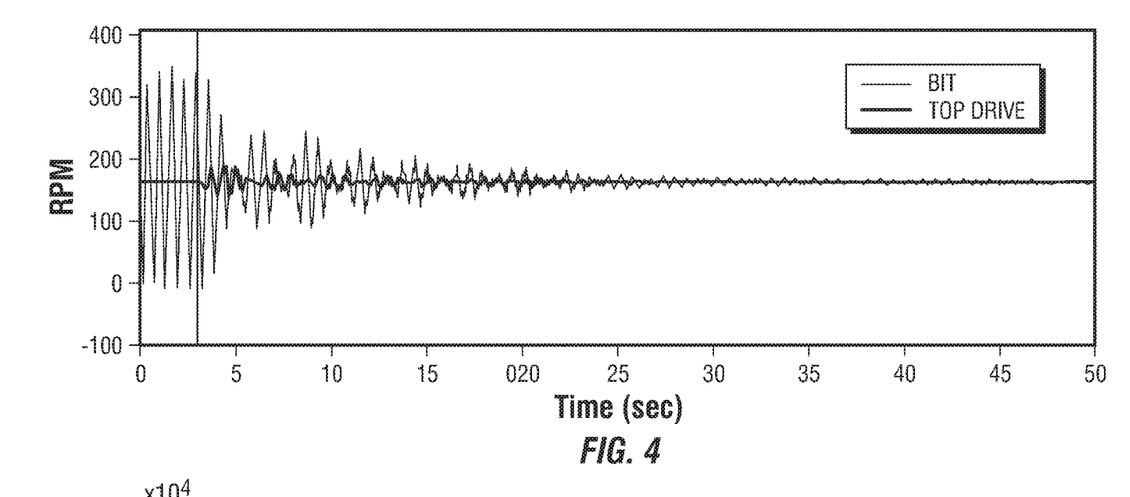
FIG. 4 is a graph depicting the rotational speed of a drill bit and a top drive over time.
Figure 6:
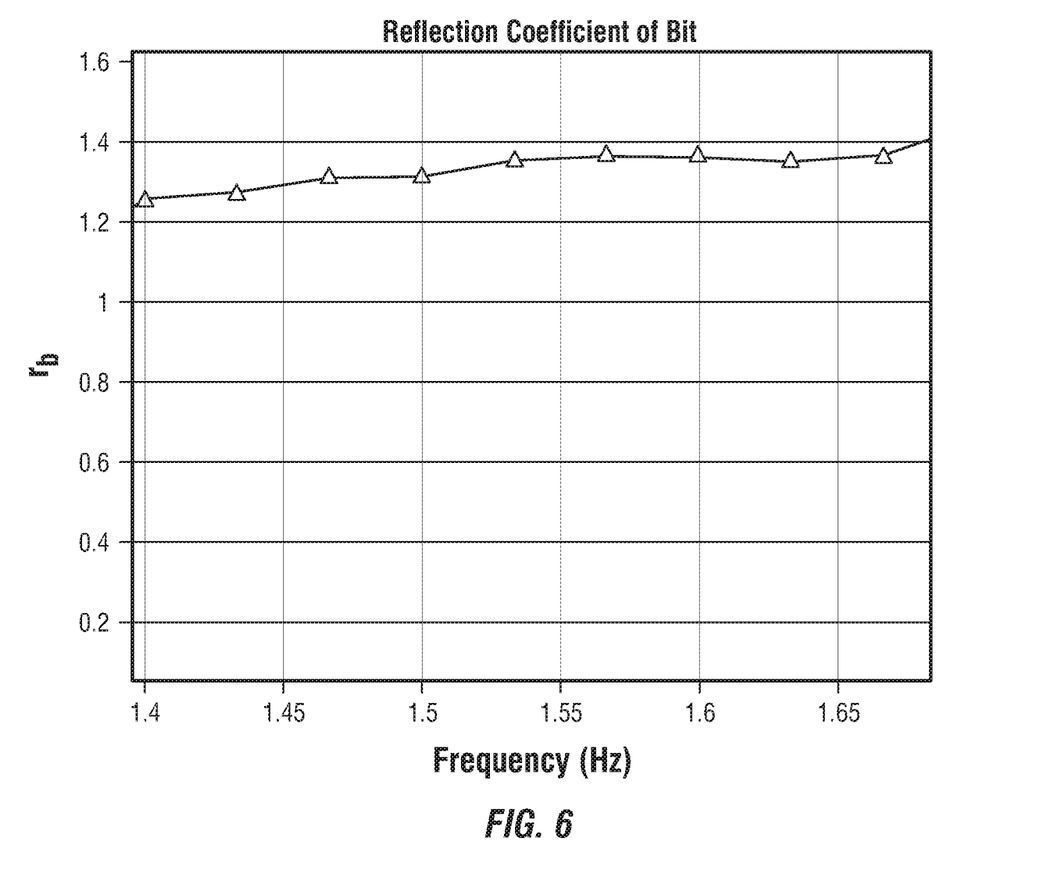
FIG. 6 is a graph depicting the coefficient of reflections of a drill bit as a function of frequency.

FIG. 4 show simulation results of a control system adjusting the rotational speed a top drive using the above method. Prior to t=3 sec., a constant-speed top drive controller is applied. It is then observed that severe stick-slip exists. Once the stick-slip vibrations and frequencies are detected, the reflection coefficients of a drill bit over the detected frequencies, 1.4 Hz-1.68 Hz, are computed, as shown by data points in FIG. 6. The control system 114 then adjusts the rotational speed of the top drive 110 such that $|r_b(s) r_d(s)| < 1$ is true for the detected frequency range. It can be seen that after t=3 sec. stick-slip oscillations gradually disappear.

Figure 5:
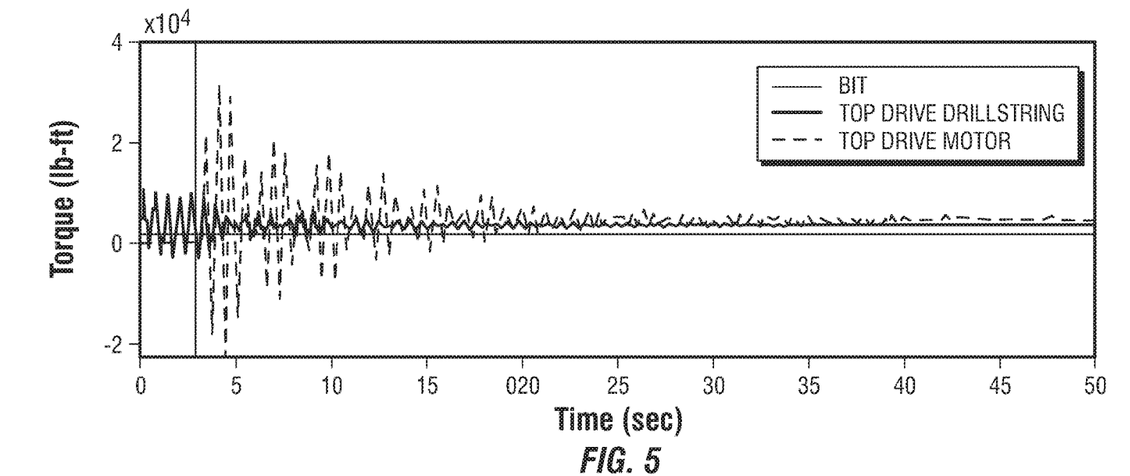
FIG. 5 is a graph depicting the torque of a drill bit and a top drive over time.

Similarly, FIG. 5 show simulation results of a control system adjusting the torque generated by a top drive using the above method. Prior to t=3 sec., a constant-speed top drive controller is applied. It is then observed that severe stick-slip exists. Once the stick-slip vibrations and frequencies are detected, the reflection coefficients of a drill bit over the detected frequencies, 1.4 Hz-1.68 Hz, are computed, as shown by data points in FIG. 6. The control system 114 then adjusts the torque generated by the top drive 110 such that $|r_b(s)r_d(s)|<1$ is true for the detected frequency range. It can be seen that after t=3 sec. stick-slip oscillations gradually disappear.

Further examples include:

Example 1 is a method for drilling a well. The method includes detecting stick-slip vibrations at a frequency via a downhole sensor. The method also includes determining a reflection coefficient of a drill bit for the frequency based on at least one of a rotational speed of the drill bit or a torque of the drill bit. The method further includes determining a reflection coefficient of a top drive for the frequency based on at least one of a rotational speed of the top drive or a torque produced by the top drive. The method also includes adjusting a control system in electronic communication with the top drive based on the reflection coefficient of the drill bit for the frequency and the reflection coefficient of the top drive for the frequency.

In Example 2, the embodiments of any preceding paragraph or combination thereof further include determining a reflection coefficient of the drill bit via a BHA computer system. The method also includes communicating the reflection coefficient of the drill bit to a surface detector in electronic communication with the control system via a telemetry system.

In Example 3, the embodiments of any preceding paragraph or combination thereof further include determining a mechanical impedance of the drill bit for the frequency via a BHA computer system based on at least one of the drill bit rotational speed or the drill bit torque. The method also includes communicating the mechanical impedance of the drill bit for the frequency to a surface detector in electronic communication with the control system via a telemetry system. The method further includes determining the reflection coefficient of the drill bit for the frequency via the control system based on the mechanical impedance of the drill bit for the frequency.

In Example 4, the embodiments of any preceding paragraph or combination thereof further include wherein adjusting the control system comprises reducing a top drive gain of the control system.

In Example 5, the embodiments of any preceding paragraph or combination thereof further include wherein adjusting the control system comprises increasing or decreasing an integral time of the control system.

In Example 6, the embodiments of any preceding paragraph or combination thereof further include wherein adjusting the control system comprises adjusting the control system such that $|r_b(s)r_d(s)|<1$ for the frequency.

In Example 7, the embodiments of any preceding paragraph or combination thereof further include detecting stick-slip vibrations over a range of frequencies via the downhole sensor. The method also includes determining the reflection coefficient of the drill bit for each frequency of the range of frequencies based on at least one of the rotational speed of the drill bit or the torque of the drill bit. The method further includes determining a reflection coefficient of the top drive for each frequency of the range of frequencies based on at least one of the rotational speed of the top drive or the torque produced by the top drive. The method also includes adjusting the control system such that $|r_b(s)r_d(s)|<1$ for each frequency of the range of frequencies.

Example 8 is a system for drilling a well. The system includes a top drive operable to rotate a drill bit, a downhole sensor, a drill bit sensor, and a control system in electronic communication with the top drive. The downhole sensor is positionable within the well and operable to detect stick-slip vibrations at a frequency of the stick-slip vibrations. The drill bit sensor is operable to detect at least one of a rotational speed of the drill bit, or a torque of the drill bit. The control system includes a processor programmed to determine a reflection coefficient of the drill bit for the frequency based on at least one of a rotational speed of the top drive or a torque produced by the top drive. The processor is further programmed to adjust the control system based on a reflection coefficient of the drill bit for the frequency and the reflection coefficient of the top drive for the frequency.

In Example 9, the embodiments of any preceding paragraph or combination thereof further include a BHA computer system in electronic communication with the downhole sensor and the drill bit sensor, and a telemetry system in electronic communication with the BHA computer system. The BHA computer system is positionable within the well and includes a processor programmed to determine the reflection coefficient of the drill bit for the frequency based on at least one of a rotational speed of the drill bit or a torque of the drill bit. The telemetry system is positionable downhole and operable to transmit the reflection coefficient of the drill bit for the frequency uphole In Example 10, the embodiments of any preceding paragraph or combination thereof further include a BHA computer system in electronic communication with the downhole sensor and the drill bit sensor and a telemetry system in electronic communication with the BHA computer system. The BHA computer system is positionable within the well and includes a processor programmed to determine a mechanical impedance of the drill bit for the frequency based on at least one of a rotational speed of the drill bit or a torque of the drill bit. The telemetry system is positionable downhole and operable to transmit the mechanical impedance of the drill bit for the frequency uphole. The control system processor is further programmed to determine the reflection coefficient of the drill bit for the frequency based on at least one of a rotational speed of the drill bit or a torque of the drill bit for the frequency In Example 11, the embodiments of any preceding paragraph or combination thereof further include wherein the control system processor is programmed to reduce a top drive gain of the control system.

In Example 12, the embodiments of any preceding paragraph or combination thereof further include wherein the control system processor is programmed to increase or decrease an integral time of the control system.

In Example 13, the embodiments of any preceding paragraph or combination thereof further include wherein the control system processor is programmed to adjust the control system such that $|r_b(s)r_d(s)|<1$ for the frequency.

Example 14 is a non-transitory computer readable medium comprising instructions which, when executed by a processor, enables the processor to perform a method for drilling a well. The method includes detecting stick-slip vibrations at a frequency via a downhole sensor. The method also includes determining a reflection coefficient of a drill bit for the frequency based on at least one of a rotational speed of the drill bit or a torque of the drill bit. The method further includes determining a reflection coefficient of a top drive for the frequency based on at least one of a rotational speed of the top drive or a torque produced by the top drive. The method also includes adjusting a control system in electronic communication with the top drive based on the reflection coefficient of the drill bit for the frequency and the reflection coefficient of the top drive for the frequency.

In Example 15, the embodiments of any preceding paragraph or combination thereof further include wherein the method also includes determining a mechanical impedance of the drill bit for the frequency via a BHA computer system based on at least one of the drill bit rotational speed or the drill bit torque. The method further includes communicating the mechanical impedance of the drill bit for the frequency to a surface detector in electronic communication with the control system via a telemetry system. The method also includes determining the reflection coefficient of the drill bit for the frequency via the control system based on the mechanical impedance of the drill bit for the frequency.

In Example 16, the embodiments of any preceding paragraph or combination thereof further include wherein the method further includes determining a reflection coefficient of the drill bit via a BHA computer system. The method also includes communicating the reflection coefficient of the drill bit to a surface detector in electronic communication with the control system via a telemetry system.

In Example 17, the embodiments of any preceding paragraph or combination thereof further include wherein adjusting the control system comprises reducing a top drive gain of the control system.

In Example 18, the embodiments of any preceding paragraph or combination thereof further include wherein adjusting the control system comprises increasing or decreasing an integral time of the control system.

In Example 19, the embodiments of any preceding paragraph or combination thereof further include wherein adjusting the control system comprises adjusting the control system is adjusted such that $|r_b(s)r_d(s)|<1$ for the frequency.

In Example 20, the embodiments of any preceding paragraph or combination thereof further include wherein the method further includes detecting stick-slip vibrations over a range of frequencies via the downhole sensor. The method also includes determining the reflection coefficient of the drill bit for each frequency of the range of frequencies based on at least one of the rotational speed of the drill bit or the torque of the drill bit. The method further includes determining a reflection coefficient of the top drive for each frequency of the range of frequencies based on at least one of the rotational speed of the top drive or the torque produced by the top drive. The method also includes adjusting the control system such that $|r_b(s)r_d(s)|<1$ for each frequency of the range of frequencies.

Certain terms are used throughout the description and claims to refer to particular features or components. As one skilled in the art will appreciate, different persons may refer to the same feature or component by different names. This document does not intend to distinguish between components or features that differ in name but not function.

For the embodiments and examples above, a non-transitory computer readable medium can comprise instructions stored thereon, which, when performed by a machine, cause the machine to perform operations, the operations comprising one or more features similar or identical to features of methods and techniques described above. The physical structures of such instructions may be operated on by one or more processors. A system to implement the described algorithm may also include an electronic apparatus and a communications unit. The system may also include a bus, where the bus provides electrical conductivity among the components of the system. The bus can include an address bus, a data bus, and a control bus, each independently configured. The bus can also use common conductive lines for providing one or more of address, data, or control, the use of which can be regulated by the one or more processors. The bus can be configured such that the components of the system can be distributed. The bus may also be arranged as part of a communication network allowing communication with control sites situated remotely from system.

In various embodiments of the system, peripheral devices such as displays, additional storage memory, and/or other control devices that may operate in conjunction with the one or more processors and/or the memory modules. The peripheral devices can be arranged to operate in conjunction with display unit(s) with instructions stored in the memory module to implement the user interface to manage the display of the anomalies. Such a user interface can be operated in conjunction with the communications unit and the bus. Various components of the system can be integrated such that processing identical to or similar to the processing schemes discussed with respect to various embodiments herein can be performed.

In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method for drilling a well, the method comprising:
controlling a top drive using a control system to rotate a drill string and a drill bit to drill the well;
detecting stick-slip vibrations of the drill string at a frequency of the stick-slip vibrations caused by the rotation of the drill string and the drill bit via a downhole sensor;
determining a reflection coefficient of the drill bit for the frequency based on at least one of a rotational speed of the drill bit or a torque of the drill bit;
determining a reflection coefficient of the top drive for the frequency based on at least one of a rotational speed of the top drive or a torque produced by the top drive; and
adjusting the control system based on the reflection coefficient of the drill bit for the frequency and the reflection coefficient of the top drive for the frequency to adjust the operation of the top drive to reduce or eliminate stick-slip of the drill string.

2. The method of claim 1, further comprising:
determining the reflection coefficient of the drill bit via a bottom-hole assembly (BHA) computer system; and
communicating the reflection coefficient of the drill bit to a surface detector in electronic communication with the control system via a telemetry system.

3. The method of claim 1, further comprising:
determining a mechanical impedance of the drill bit for the frequency via a BHA computer system based on at least one of the drill bit rotational speed or the drill bit torque; and
communicating the mechanical impedance of the drill bit for the frequency to a surface detector in electronic communication with the control system via a telemetry system; and
determining the reflection coefficient of the drill bit for the frequency via the control system based on the mechanical impedance of the drill bit for the frequency.

4. The method of claim 1, wherein adjusting the control system comprises reducing a top drive gain of the control system.

5. The method of claim 1, wherein adjusting the control system comprises increasing or decreasing an integral time of the control system.

6. The method of claim 1, wherein adjusting the control system comprises adjusting the control system such that $|r_b(s) \cdot r_d(s)| < 1$ for the frequency, wherein $r_b(s)$ is the reflection coefficient of the drill bit and $r_d(s)$ is the reflection coefficient of the top drive.

7. The method of claim 6, further comprising:
detecting stick-slip vibrations over a range of frequencies via the downhole sensor;
determining the reflection coefficient of the drill bit for each frequency of the range of frequencies based on at least one of the rotational speed of the drill bit or the torque of the drill bit;
determining a reflection coefficient of the top drive for each frequency of the range of frequencies based on at least one of the rotational speed of the top drive or the torque produced by the top drive; and
adjusting the control system such that $|r_b(s) \cdot r_d(s)| < 1$ for each frequency of the range of frequencies.

8. A system for drilling a well, the system comprising:
a top drive operable to rotate a drill string and a drill bit;
a downhole sensor positionable within the well and operable to detect stick-slip vibrations of the drill string at a frequency of the stick-slip vibrations caused by the rotation of the drill string and the drill bit; and
a drill bit sensor operable to detect at least one of a rotational speed of the drill bit, or a torque of the drill bit;
a control system in electronic communication with the top drive, the control system comprising a processor programmed to
adjust the control system based on a determined reflection coefficient of the drill bit for the frequency based on at least one of a rotational speed of the drill bit or a torque of the drill bit and a reflection coefficient of the top drive for the frequency based on at least one of a rotational speed of the top drive or a torque produced by the top drive to adjust the operation of the top drive to reduce or eliminate stick-slip of the drill string.

9. The system of claim 8, further comprising:
a BHA computer system in electronic communication with the downhole sensor and the drill bit sensor, and positionable within the well, the BHA computer system comprising a processor programmed to determine the reflection coefficient of the drill bit for the frequency based on at least one of a rotational speed of the drill bit or a torque of the drill bit; and
a telemetry system in electronic communication with the BHA computer system and positionable downhole, the telemetry system operable to transmit the reflection coefficient of the drill bit for the frequency uphole.

10. The system of claim 8, further comprising:
a BHA computer system in electronic communication with the downhole sensor and the drill bit sensor, and positionable within the well, the BHA computer system comprising a processor programmed to determine a mechanical impedance of the drill bit for the frequency based on at least one of a rotational speed of the drill bit or a torque of the drill bit; and
a telemetry system in electronic communication with the BHA computer system and positionable downhole, the telemetry system operable to transmit the mechanical impedance of the drill bit for the frequency uphole.

11. The system of claim 8, wherein the control system processor is programmed to reduce a top drive gain of the control system.

12. The system of claim 8, wherein the control system processor is programmed to increase or decrease an integral time of the control system.

13. The system of claim 8, wherein the control system processor is programmed to adjust the control system such that $|r_b(s) \cdot r_d(s)| < 1$ for the frequency, wherein $r_b(s)$ is the reflection coefficient of the drill bit and $r_d(s)$ is the reflection coefficient of the top drive.

14. A non-transitory computer readable medium comprising instructions which, when executed by a processor, enables the processor to perform a method for drilling a well, the method comprising:
controlling a top drive using a control system to rotate a drill string and a drill bit to drill the well;
detecting stick-slip vibrations of the drill string at a frequency of the stick-slip vibrations caused by the rotation of the drill string and the drill bit via a downhole sensor;
determining a reflection coefficient of the drill bit for the frequency based on at least one of a rotational speed of the drill bit or a torque of the drill bit;
determining a reflection coefficient of the top drive for the frequency based on at least one of a rotational speed of the top drive or a torque produced by the top drive; and
adjusting the control system based on the reflection coefficient of the drill bit for the frequency and the reflection coefficient of the top drive for the frequency to adjust the operation of the top drive to reduce or eliminate stick-slip of the drill string.

15. The non-transitory computer readable medium of claim 14, wherein the method further comprises:
determining a mechanical impedance of the drill bit for the frequency via a BHA computer system based on at least one of the drill bit rotational speed or the drill bit torque; and
communicating the mechanical impedance of the drill bit for the frequency to a surface detector in electronic communication with the control system via a telemetry system; and wherein determining the reflection coefficient of the drill bit for the frequency via the control system is further based on the mechanical impedance of the drill bit for the frequency.

16. The non-transitory computer readable medium of claim 14, wherein the method further comprises:
    determining the reflection coefficient of the drill bit via a BHA computer system; and
    communicating the reflection coefficient of the drill bit to a surface detector in electronic communication with the control system via a telemetry system.

17. The non-transitory computer readable medium of claim 14, wherein adjusting the control system comprises reducing a top drive gain of the control system.

18. The non-transitory computer readable medium of claim 14, wherein adjusting the control system comprises increasing or decreasing an integral time of the control system.

19. The non-transitory computer readable medium of claim 14, wherein adjusting the control system comprises adjusting the control system is adjusted such that $|r_b(s) \cdot r_d(s)| < 1$ for the frequency, wherein $r_b(s)$ is the reflection coefficient of the drill bit and $r_d(s)$ is the reflection coefficient of the top drive.

20. The non-transitory computer readable medium of claim 14, wherein the method further comprises:
    detecting stick-slip vibrations over a range of frequencies via the downhole sensor;
    determining the reflection coefficient of the drill bit for each frequency of the range of frequencies based on at least one of the rotational speed of the drill bit or the torque of the drill bit;
    determining the reflection coefficient of the top drive for each frequency of the range of frequencies based on at least one of the rotational speed of the top drive or the torque produced by the top drive; and
    adjusting the control system such that $|r_b(s) \cdot r_d(s)| < 1$ for each frequency of the range of frequencies.

* * * * *